May 4, 1954     W. H. MAYNE     2,677,729
DIFFERENTIAL AMPLIFIER
Filed July 9, 1952

INVENTOR
William H. Mayne,
BY Watson, Cole, Grindle & Watson
ATTORNEYS

Patented May 4, 1954

2,677,729

UNITED STATES PATENT OFFICE 2,677,729

DIFFERENTIAL AMPLIFIER

William Harry Mayne, San Antonio, Tex., assignor to Olive S. Petty, San Antonio, Tex.

Application July 9, 1952, Serial No. 297,807

3 Claims. (Cl. 179—171)

This invention relates to an electronic circuit for the amplification of wave form signal energy, and more particularly to amplifiers of the differential type, such as are designed to provide output voltages proportional to the difference between two concurrently applied grid voltages, and relatively independent of the absolute values of such grid voltages. It is the principal object of the invention to provide, in an amplifier of this general character, a circuit which is substantially free from drift and unbalance, and which is unaffected by minor fluctuations in power supply or variation of tube current flow.

Differential amplifiers are commonly employed in measuring and recording equipment, such as cathode ray oscilloscope amplifiers, meter amplifiers, and devices of similar nature wherein the D. C. component of a rapidly fluctuating signal must be observed or recorded. In conventional circuits employed for these and related purposes, it has heretofore been deemed essential, in the interest of precision, to employ tubes having identical characteristics and exhibiting linearity under variable conditions, and to maintain as nearly constant as possible all other conditions of operation. Power supply fluctuations have invariably affected adversely the precision of operation of such circuits.

It is a feature of the instant invention that the novel amplifier circuit may operate in a theoretically exact manner despite variation of external conditions, the precision obtainable depending only on the degree of tube identity, and not requiring an ideal relationship of tube characteristics, such as is seldom achieved in practice. The circuit is, in particular, balanced to compensate for power supply fluctuations, and this balance is independent of tube characteristics and of actual magnitude of power supply voltage.

More specifically, it is an object of the invention to provide an amplifier circuit employing, in effect, an outer balanced bridge circuit embracing the power supply, and an inner bridge circuit in which are located the amplifier tubes and the output terminals, the arrangement being such that the tube cathodes and output terminals are maintained at zero potential with respect to ground.

Figure 1:
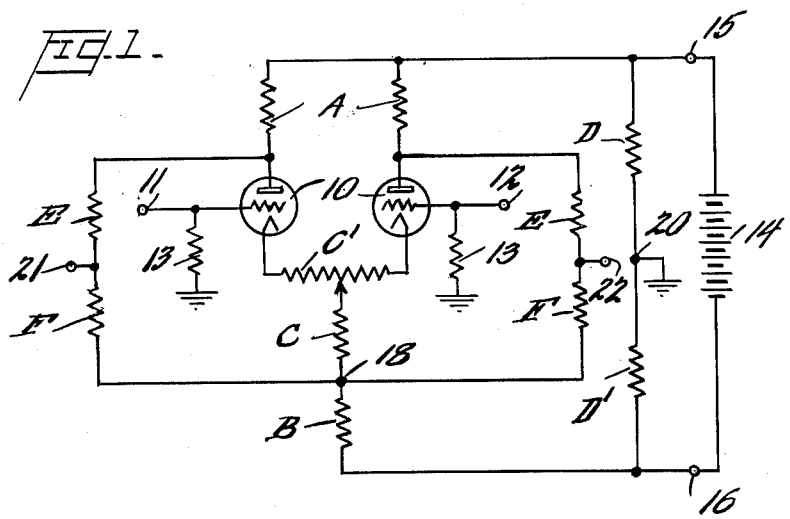
Figure 2:
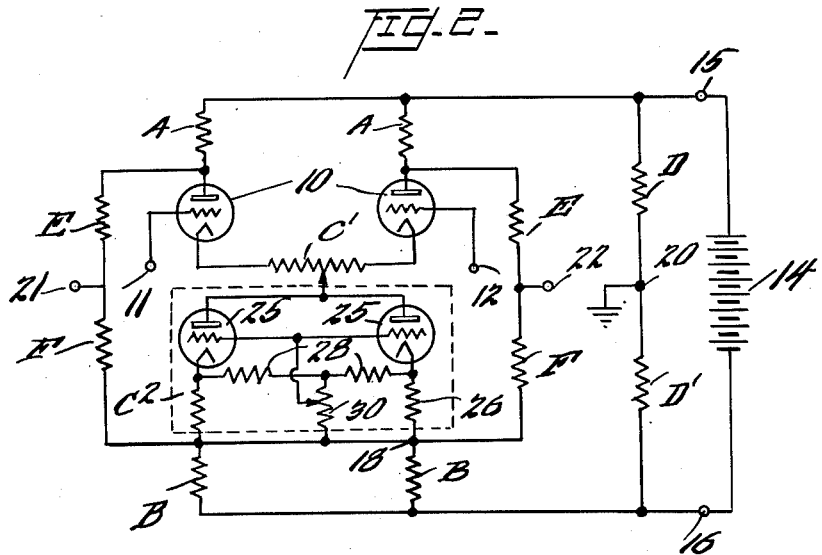

Further objects and features of the invention will be apparent from the following description taken in connection with the accompanying drawings, in which Figure 1 illustrates the application of the invention to a known type of differential circuit employed for the measurement of D. C. voltage fluctuations, and Figure 2 illustrates a slightly modified form of the circuit shown in Figure 1.

In order to facilitate an understanding of the invention, the specific embodiment shown in the drawings is described in detail. It will nevertheless be understood that restriction of the scope of the invention is not thereby intended, and that such changes and alterations are contemplated as would occur to one skilled in the art to which the invention relates.

Referring first to Figure 1 of the drawing, it will be observed that two vacuum tubes 10 of the triode type, each having a cathode, a control grid, and an anode are shown, it being understood that other tube types, and especially multi-grid tubes, may be employed in lieu of triodes. Input terminals 11 and 12, connected to the control grids of the respective tubes, are supplied with signal energy to be measured and amplified, each terminal being connected to ground through a resistor 13. The circuit power supply is represented by a source 14 of anode voltage having a positive terminal 15 and a negative terminal 16; a voltage divider comprising resistors D, $D^1$, grounded at intermediate point 20, is applied across the source 14. Anode voltage is applied to the anodes of tubes 10 through anode resistors A from positive terminal 15 of source 14, and the negative terminal 16 of the source 14 is connected to the tube circuit at a junction point 18 through a balancing resistor B. Output terminals 21 and 22 are connected with the anodes of the respective tubes 10 through coupling resistors E and with junction point 18 through coupling resistors F. A cathode resistance, which may comprise resistor C and a tapped resistor $C^1$, connects the cathodes of the tubes 10 to the junction point 18, and thence through balancing resistor B to the negative terminal of the source 14 of anode voltage. Preferably the connection between resistor C and tapped resistor $C^1$ may be varied to provide compensating adjustment for slight difference in characteristics of the tubes 10.

It will be observed that the circuit just described constitutes, in effect, two bridge circuits, and it is essential that these circuits be balanced. To this end, the following resistance ratios must be observed:

$$\frac{A}{2B}=\frac{D}{D^1}=\frac{E}{F}$$

In addition, it is preferred for optimum operation that the following resistance ratios be established:

$$\frac{TPR}{\frac{C^1}{2}+2C}=\frac{D}{D^1}, \text{ etc.}$$

where TPR is the plate resistance of each tube. Conveniently, the opposed resistances will have equal values; thus, the coupling resistors E and the anode resistors A may be of equal value. It will be noted that in each ratio given above, the ratio is that which the member having the higher voltage with respect to ground bears to the member of lower voltage.

It will be observed that when the circuit is balanced in the manner indicated, the output voltages at terminals 21 and 22 are completely unaffected by power supply fluctuations, provided the tubes are essentially identical, and the maintenance of balance is entirely independent of tube current. The circuit lends itself well to use in an amplifier employing a series of amplifier stages in cascade, permitting conductive coupling without cumulative shifts in the operating points of the successive stages due to variation in tube characteristics or to fluctuation in supply voltages. When the values of the various resistances are properly established, the output terminal will invariably be maintained at zero potential with respect to ground.

Turning now to the embodiment of the invention shown in Figure 2 of the drawing, it will be observed that the arrangement is essentially similar to that of Figure 1, with the exception that the single resistor C is replaced by circuit C² in which the resistance is supplied, at least in part, by tubes 25. Since other parts of the circuit are identical with those illustrated in Figure 1, similar reference characters are employed, and the foregoing descriptive matter is equally applicable thereto.

Thus junction point 18 of the circuit of Figure 2 is connected to the tapped cathode resistor C¹ through resistors 26 and tubes 25. The cathodes of tubes 25 are connected by resistors 28, and variable grid bias for the tubes is supplied through resistors 28 from a tapped resistor 30. This arrangement forms a very practical symmetrical circuit, since the preferred ratio of resistances expressed by $$\frac{TPR}{\frac{C^1}{2}+2C^2}$$

can very readily be established by appropriate selection of tubes 25.

As in the arrangement shown in Figure 1, the resistance ratios of (1) voltage divider resistors D, D¹, (2) coupling resistors E, F, and (3) anode resistors A and balancing resistors B must be equal; the same ratio is preferably also established for the plate resistance of tubes 10 and the resistance between cathodes and junction point 18, whereby complete balancing of tubes 10 over a greater range of conditions is made possible.

Having thus described the invention, what is claimed as new and desired to be secured by Letters Patent is:

1. An electronic amplifier comprising, in combination, a pair of vacuum tubes, each having a cathode, an anode, and a control grid to which signal energy is applied, a source of anode voltage, voltage divider resistors connected between each source terminal and ground, a pair of output terminals, a coupling resistor between one of said output terminals and the anode of one of said tubes, and a coupling resistor between the other of said output terminals and the anode of the other of said tubes, and between each output terminal and a junction point, a cathode resistance between said junction point and the cathode of each of said tubes, a balancing resistance between said junction point and the negative terminal of said source, and an anode resistance between the anodes of said tubes and the positive terminal of said source, the resistance ratios of (1) the voltage divider resistors, (2) the coupling resistors associated with each output terminal, and (3) the anode resistance and the balancing resistance being equal, the ratio in each instance being that which the member of higher voltage with respect to ground bears to the member of lower voltage.

2. A differential amplifier comprising, in combination, a pair of vacuum tubes, each having a cathode, an anode, and a control grid to which signal energy is applied, a source of anode voltage, voltage divider resistors connected between each source terminal and ground, a pair of output terminals, a coupling resistor between one of said output terminals and the anode of one of said tubes, and a coupling resistor between the other of said output terminals and the anode of the other of said tubes, and between each output terminal and a junction point, a cathode resistance between said junction point and the cathode of each of said tubes, a balancing resistor between said junction point and the negative terminal of said source, and an anode resistance between the anodes of said tubes and the positive terminal of said source, the resistance ratios of (1) the voltage divider resistors, (2) the coupling resistors associated with each output terminal, (3) the anode resistance and the balancing resistor, and (4) the total parallel plate resistance of the tubes and the cathode resistance being equal, the ratio in each instance being that which the member of higher voltage with respect to ground bears to the member of lower voltage.

3. An amplifier as claimed in claim 1 in which the cathode resistance comprises a tapped cathode resistor connecting the cathodes of the two tubes, and a resistor connecting said junction point with a selected tap on said tapped resistor.

References Cited in the file of this patent

UNITED STATES PATENTS

| Number | Name | Date |
|---|---|---|
| 2,390,824 | Berry | Dec. 11, 1945 |
| 2,498,103 | Wojciechowski | Feb. 21, 1950 |
| 2,510,347 | Perkins | June 6, 1950 |
| 2,538,539 | Stokes | Jan. 16, 1951 |

FOREIGN PATENTS

| Number | Country | Date |
|---|---|---|
| 491,772 | Great Britain | Sept. 8, 1938 |